US011420874B2

(12) United States Patent
Rohde et al.

(10) Patent No.: US 11,420,874 B2
(45) Date of Patent: Aug. 23, 2022

(54) CONCENTRATING GRAPHITE PARTICLES BY AGGLOMERATION WITH HYDROPHOBIC MAGNETIC PARTICLES

(71) Applicant: BASF SE, Ludwigshafen am Rhein (DE)

(72) Inventors: Wolfgang Rohde, Ludwigshafen am Rhein (DE); Andreas Luz, Ludwigshafen am Rhein (DE); Michael Mentges, Ludwigshafen am Rhein (DE); Oliver Kuhn, Ludwigshafen am Rhein (DE); Rodrigo Enrique Munizaga, Santiago (CL)

(73) Assignee: BASF SE, Ludwigshafen am Rhein (DE)

( * ) Notice: Subject to any disclaimer, the term of this patent is extended or adjusted under 35 U.S.C. 154(b) by 40 days.

(21) Appl. No.: 16/651,413

(22) PCT Filed: Sep. 18, 2018

(86) PCT No.: PCT/EP2018/075152
§ 371 (c)(1),
(2) Date: Mar. 27, 2020

(87) PCT Pub. No.: WO2019/063354
PCT Pub. Date: Apr. 4, 2019

(65) Prior Publication Data
US 2020/0290880 A1 Sep. 17, 2020

(51) Int. Cl.
| B03C 1/01 | (2006.01) |
| C01B 32/215 | (2017.01) |
| B03C 1/00 | (2006.01) |
| H01F 1/28 | (2006.01) |

(52) U.S. Cl.
CPC ............ *C01B 32/215* (2017.08); *B03C 1/002* (2013.01); *B03C 1/01* (2013.01); *H01F 1/28* (2013.01); *B03C 2201/18* (2013.01); *C01P 2004/30* (2013.01); *C01P 2004/50* (2013.01)

(58) Field of Classification Search
CPC ......... C01B 32/215; B03C 1/002; B03C 1/01; B03C 2201/18; H01F 1/28
See application file for complete search history.

(56) References Cited

U.S. PATENT DOCUMENTS

| 2,012,684 | A | | 8/1935 | Kennedy | |
| 2,914,383 | A | | 11/1959 | Ulrich | |
| RE30,360 | E | * | 8/1980 | Shubert | B03C 1/01 209/214 |
| 4,935,147 | A | * | 6/1990 | Ullman | B03C 1/01 210/222 |
| 5,076,950 | A | | 12/1991 | Ullman et al. | |
| 5,161,694 | A | * | 11/1992 | Yoon | B03B 1/04 209/165 |
| 8,486,270 | B2 | | 7/2013 | Rieger et al. | |
| 8,715,494 | B2 | | 5/2014 | Danov et al. | |
| 9,028,687 | B2 | | 5/2015 | Goraj | |
| 9,028,699 | B2 | | 5/2015 | Danov et al. | |
| 9,126,206 | B2 | | 9/2015 | Hartmann et al. | |
| 10,618,058 | B2 | * | 4/2020 | Anderson | B03D 1/02 |
| 11,103,880 | B2 | | 8/2021 | Ellis et al. | |
| 2009/0314717 | A1 | * | 12/2009 | Fujieda | B03C 1/01 210/663 |
| 2012/0132032 | A1 | * | 5/2012 | Domke | C22B 1/14 75/10.67 |
| 2013/0087505 | A1 | | 4/2013 | Danov et al. | |
| 2013/0256233 | A1 | | 10/2013 | Danov et al. | |
| 2013/0313177 | A1 | | 11/2013 | Danov et al. | |
| 2013/0344237 | A1 | | 12/2013 | Guo | |
| 2018/0369834 | A1 | | 12/2018 | Rohde et al. | |
| 2020/0122160 | A1 | | 4/2020 | Gilbert et al. | |

FOREIGN PATENT DOCUMENTS

| AU | 6093790 A | 2/1991 |
| AU | 622346 B2 | 4/1992 |
| AU | 2011224015 A1 | 4/2012 |
| CN | 102725067 A | 10/2012 |
| CN | 104394995 A | 3/2015 |
| DE | 102010023130 A1 | 12/2011 |
| DE | 202011104707 U1 | 2/2012 |
| DE | 102010061952 A1 | 5/2012 |
| EP | 3181230 A1 | 6/2017 |
| WO | WO-2011107353 A1 | 9/2011 |
| WO | WO-2011131411 A1 | 10/2011 |
| WO | WO-2011134710 A1 | 11/2011 |
| WO | WO-2011154178 A1 | 12/2011 |
| WO | WO-2012104292 A1 | 8/2012 |
| WO | WO-2012107274 A1 | 8/2012 |
| WO | WO-2012116909 A1 | 9/2012 |
| WO | WO-2013167634 A1 | 11/2013 |
| WO | WO-2015110555 A1 | 7/2015 |
| WO | WO-2016083491 A1 | 6/2016 |
| WO | WO-2016083575 A1 | 6/2016 |

OTHER PUBLICATIONS

European Search Report for EP Patent Application No. 17194111.5, dated Mar. 9, 2018, 3 pages.
International Preliminary Report on Patentability received for PCT Patent Application No. PCT/EP2018/075152, dated Mar. 31, 2020, 09 pages.
Shujuan, et al., "An Experiment Study on Flotation Process of Fine Scaly Graphite from Dandong in Liaoning", Advance Journal of Food Science and Technology, vol. 6, Issue 8, Aug. 10, 2014, pp. 989-993.

(Continued)

*Primary Examiner* — Patrick H Mackey
(74) *Attorney, Agent, or Firm* — Faegre Drinker Biddle & Reath LLP

(57) ABSTRACT

A process for concentrating graphite particles comprising a) providing a feedstock which contains the graphite particles and an undesired material, b) adding hydrophobic magnetic particles to the feedstock which results in a loaded feedstock containing agglomerates of the magnetic particles and the graphite particles, and c) separating the agglomerates from the loaded feedstock by a magnetic field which results in isolated agglomerates.

19 Claims, No Drawings

(56) References Cited

OTHER PUBLICATIONS

International Search Report for PCT/EP2018/075152 dated Nov. 22, 2018.
Written Opinion of the International Searching Authority for PCT/EP2018/075152 dated Nov. 22, 2018.

* cited by examiner

CONCENTRATING GRAPHITE PARTICLES BY AGGLOMERATION WITH HYDROPHOBIC MAGNETIC PARTICLES

CROSS-REFERENCE TO RELATED APPLICATIONS

This application is a national stage application (under 35 U.S.C. § 371) of PCT/EP2018/075152, filed Sep. 18, 2018, which claims benefit of European Application No. 17194111.5, filed Sep. 29, 2017, both of which are incorporated herein by reference in their entirety.

The invention relates to a process for concentrating graphite particles comprising providing a feedstock which contains the graphite particles and undesired material, adding hydrophobic magnetic particles to the feedstock which results in a loaded feedstock containing agglomerates of the magnetic particles and the graphite particles, and separating the agglomerates from the loaded feedstock by a magnetic field which results in isolated agglomerates. It further relates to an agglomerate comprising a graphite particle, a hydrophobic magnetic particle, and a collector.

Graphite is an important raw material for many applications, and various methods for mining graphite ores are known. Graphite can also be synthesized from various carbonaceous raw materials.

Graphite ore flotation is generally known and usually several purification steps are necessary to obtain a graphite ore concentrate.

Shujuan and Meng, Adv. J. Food Sci. and Technology, 6 (2014), 989-993, disclose a process comprising three flotation steps of fine scaly graphite.

AU 199060937 discloses the processing of graphite ore using surfactant dispersions in order to spall graphite grains from the undesired gangue material. The resulting liberated graphite is recovered by froth flotation using kerosene as collector and frother chemicals.

U.S. Pat. No. 2,012,684 discloses the purification of graphite ore concentrates obtained by mechanical treatment of graphite ores by treatment with ammonium bisulphate in a cyclic process.

U.S. Pat. No. 2,914,383 describes the purification of graphite ores by the action of fluorine or chlorine containing gases.

Object of the present invention was to find a method of concentrating graphite which avoids the disadvantages of the prior art, such as the use frother chemicals or corrosive chemicals like bisulfate or halogens, and a to find a method that offers high enrichment of the graphite in a single step.

The object was solved by a process for concentrating graphite particles comprising
a) providing a feedstock which contains the graphite particles and an undesired material,
b) adding hydrophobic magnetic particles to the feedstock which results in a loaded feedstock containing agglomerates of the magnetic particles and the graphite particles, and
c) separating the agglomerates from the loaded feedstock by a magnetic field which results in isolated agglomerates.

The object was also solved by an agglomerate comprising a graphite particle, a hydrophobic magnetic particle, and a collector.

The process for concentrating graphite particles usually increases the concentration of the graphite particles in the feedstock by a factor of 1.1. to 100, preferably a factor of 2 to 20.

Step a)

In step a) a feedstock is provided which contains the graphite particles and an undesired material.

Graphite refers preferably to a hexagonal or rhombohedral crystalline, multi-layer modification of chemical element carbon. Graphite may have a density of 2.1 to 2.3, a sublimation point of about 3750° C., or a hardness of about 1. Typically, parallel layers of condensed planar 06 rings constitute the crystal structure of graphite. Each carbon atom may join to three neighboring carbon atoms at 120° angles in the plane of the layer. In the hexagonal graphite crystal lattice the third layer is arranged exactly below the first layer (-A-B-A-B- sequence), and in the rhombohedral graphite crystal lattice the fourth layer is arranged exactly below the first layer (-A-B-C-A-B-C- sequence). Graphite may be a multi-layer modification, which means that graphite may comprise at least two layers, preferably at least three layers, and in particular at least ten layers.

The feedstock may be based on natural graphite ore or from anthropogenic sources. Natural graphite ore typically contains other mineral constituents like quartz, mica, gneiss and feldspars.

As suitable feedstock from anthropogenic sources may be electronic scrap or battery scrap. Battery scrap may contain an anodic and cathodic electrode material in powdered form. Preferably, the feedstock is based on natural graphite ore, electronic scrap, or battery scrap.

In another form graphite also refers to a hexagonal single layer modification of carbon known as graphene. Graphene may be prepared by reduction or pyrolysis of graphite oxide, by solveothermal synthesis of sodium and ethanol, or by exfoliation with organic solvents. These reaction mixtures or raw products are also suitable as feedstock. In a preferred form the term graphite does not comprise graphene.

The feedstock comprises typically at least 0.1 wt %, preferably at least 1 wt %, more preferred at least 3 wt % and in particular at least 20 wt % graphite. The feedstock comprises typically 1 to 99 wt % graphite, preferably 10 to 80 wt % graphite.

The feedstock from battery scrap may contain 1 to 80 wt %, preferably 3 to 50 wt %, and in particular 1 to 15 wt % of graphite.

The graphite particles comprise graphite. Usually, the graphite particles comprise at least 50 wt %, preferably at least 70 wt %, and in particular at least 90 wt % graphite. In another form the graphite particles essentially consist of graphite.

The feedstock may be pretreated in a way that predominantly graphite particles are contained which are liberated from adhering undesired materials. Such pretreatments may comprise milling and sieving or sifting stages which may be combined in milling and sifting circuits. A pretreatment by a flotation or carrier flotation is also possible.

There are feedstocks that may contain magnetic or magnetizable material, such as ferromagnetic, ferrimagnetic or paramagnetic materials (like magnetic metals e.g. iron, cobalt, nicke, l or magnetic alloys e.g. ferrites or iron rare earth magnetic alloys or magnetic minerals like magnetite, hematite, pyrrhotite). The feedstock may be subjected to a magnetic separation to remove the magnetic or magnetizable material. The feedstock comprises typically up to 10 wt %, preferably up to 5 wt %, and in particular up to 1 wt % magnetic or magnetizable particles.

The graphite particles have in general an average diameter that enables this particle to efficiently agglomerate with the magnetite particles. In a preferred embodiment, the graphite particle has a $D_{50}$ of from 1 nm to 1 mm, and preferably of from 0.1 μm to 500 μm and most preferred in the range between 1 μm and 50 μm. The average diameter of the graphite particles may be determined by Laser Diffraction Measurement, e.g. Laser Diffraction Measurement using a Mastersizer 2000 or 3000 with software version 5.12G, wherein the sample is dispersed in water or an alcohol. The particle size of the graphite particles, can be reduced prior use by grinding or milling.

Suitable undesired material may contain a metal a hydrophilic metal compound or a hydrophilic semimetal compound. The undesired material may comprise metal oxide or semimetaloxides, carbonate comprising metal or semimetal compounds, silicate comprising metal or semimetal compounds, sulfidic metal or semimetal compounds, hydroxidic metal or semimetal compounds or mixtures thereof. These materials may be present as minerals ceramics or glasses.

Typical metal oxides or semimetal oxides include, but are not limited to, silicon dioxide ($SiO_2$), silicates, aluminosilicates, such as feldspars, albite ($Na(Si_3Al)O_8$), mica, for example muscovite ($KAl_2[(OH,F)_2AlSi_3O_{10}]$), garnets (Mg, Ca, $Fe^{II}$)$_3$(Al, $Fe^{III}$)$_2$($SiO_4$)$_3$ and further related minerals and mixtures thereof. The undesired material may be selected from $SiO_2$, CaO, $Al_2O_3$, MgO, $P_2O_3$, $ZrO_2$, $Fe_2O_3$, $Fe_3O_4$, $CeO_2$, $Cr_2O_3$, complex oxide matrices and mixtures thereof.

In electronic scrap or battery scrap the undesired material may comprise plastics, copper, silver, gold, ceramics, glass, cathode material, such as zinc, lithium manganese oxide, lithium cobalt oxide, lithium nickel oxide, lithium nickel cobalt manganese oxides of various stoichiometries, or lithium nickel cobalt aluminum oxides of various stoichiometries.

The feedstock may be a dispersion, preferably an aqueous dispersion. The term dispersion may include a suspension and a suspoemulsion. The continuous phase of the dispersion comprises usually at least 50 wt %, preferably at least 80 wt %, and in particular at least 90 wt % of water. The dispersion may have a solid content of 3 to 50 wt %, preferably of 10 to 45 wt %. The term "dispersion" refers to material comprising more than one phase wherein at least one of the phases consists of finely divided phase domains, often in the colloidal size range, dispersed throughout a continuous phase.

The feedstock may further contain a collector. A suitable collector selectively forms a hydrophobic layer on the graphite particles. Collectors are typically known for their use in flotation processes. Preferred collectors are non-ionic collector, which usually are liquid, non-polar compounds that do not dissociate in water.

Preferably, the collector is a hydrocarbon. The hydrocarbon may be a uniform hydrocarbon or a hydrocarbon mixture. The hydrocarbons may have a viscosity of from 0.1 to 100 cP, preferably from 0.5 to 5 cP, in each case at 20° C. The hydrocarbon may be mineral oils, vegetable oils, biodiesel, BtL (Biomass-to-Liquid) fuels, products of coal liquefaction, products of the GtL (Gas to Liquid, from natural gas) process, long chain alcohols, and mixtures thereof. The collector is preferably a mineral oil.

Suitable mineral oils are crude oil derivatives and/or oils produced from brown coal, hard coal, peat, wood, petroleum and, if appropriate, other mineral raw materials by distillation. Mineral oils generally comprise hydrocarbon mixtures of paraffinic hydrocarbons, i.e. saturated linear and branched hydrocarbons, naphthenic hydrocarbons, i.e. saturated cyclic hydrocarbons, and aromatic hydrocarbons.

A preferred hydrocarbon is the crude oil derivative selected from diesel, petroleum, kerosene, or gas oil. Diesel is based essentially on mineral oil, i.e. diesel is a fraction in the fractionation of mineral oil by distillation. The main constituents of diesel are predominantly alkanes, cycloalkanes and aromatic hydrocarbons having from about 9 to 22 carbon atoms per molecule and a boiling range from 170° C. to 390° C.

Further mineral oils are light gas oil (boiling point 235-300° C., also referred to, depending on the specification, as "diesel", "diesel fuel", "DF", "light heating oil", "LHO"), heavy gas oil (boiling point 300-375° C.) and also (in the USA) "No. 2 fuel".

Long chain alcohols are usually aliphatic $C_3$-$C_{30}$ alcohols, preferably aliphatic $C_8$-$C_{24}$ alcohols, and in particular aliphatic $C_{12}$-$C_{18}$ alcohols, such as dodecanol.

Vegetable oils are generally fats and fatty oils which are obtained from oil plants. Vegetable oils comprise, for example, triglycerides. Vegetable oils which are suitable for the purposes of the invention are, for example, selected from the group consisting of sunflower oil, rapeseed oil, safflower oil, soybean oil, corn oil, peanut oil, olive oil, herring oil, cotton seed oil, palm oil and mixtures thereof.

Biodiesel generally has a composition known to those skilled in the art. Biodiesel comprises essentially methyl esters of saturated $C_{16}$-$C_{18}$-fatty acids and unsaturated $C_{18}$-fatty acids, in particular the methyl ester of rapeseed oil.

Products of coal liquefaction can, for example, be obtained by the Fischer-Tropsch or Sasol process. The BtL and GtL processes are known to those skilled in the art.

The feedstock comprises typically up to 15 wt %, preferably up to 7 wt %, and in particular up to 4 wt % of the collector (e.g. the mineral oil) based on dry mass of the feedstock. In another form the feedstock comprises typically 0.01 to 10 wt %, preferably 0.1 to 5 wt %, and in particular 0.2 to 3 wt % of the collector (e.g. the mineral oil) based on dry mass of the feedstock. In another form the feedstock comprises typically at least 0.05 wt %, preferably at least 0.1 wt %, and in particular at least 0.3 wt % of the collector (e.g. the mineral oil) based on dry mass of the feedstock.

The collector may be added to the feedstock in the desired amount, or it may be already present in the feedstock from other process steps. For example, the collector may originate from waste oils contained in the waste stream e.g. from motors, hydraulic devices or cooling liquids or transformer liquids. Preferably, the collector is added to the feedstock in the desired amount.

The feedstock comprising the collector may be mixed, e.g. with stirrers, rotor-stator-mixers circular pumping systems, or static mixtures within a flow of the mixture. Typically the mixing is done at specific mixing energies in the range of 0.1 to 1000 kWh/m$^3$ preferably in the range of 1 to 700 kWh/m$^3$.

Step b)

In step b) hydrophobic magnetic particles are added to the feedstock which results in a loaded feedstock containing agglomerates of the magnetic particles and the graphite particles.

Suitable magnetic particles may be selected from of magnetic metals, preferably iron and its alloys, cobalt, nickel and mixtures thereof; ferromagnetic or ferrimagnetic alloys of magnetic metals, for example NdFeB, SmCo and mixtures thereof; magnetic iron oxides, for example magnetite, magnetic hematite, hexagonal ferrites; cubic ferrites; and mixtures thereof. Preferably, the magnetic particle is a magnetic iron oxide, in particular magnetite.

The magnetic particles have in general an average diameter that enables this particle to efficiently agglomerate with the graphite particles. In a preferred embodiment, the magnetic particle has a $D_{50}$ of from 1 nm to 1 mm, and preferably of from 0.1 µm to 50 µm and most preferred in the range between 1 µm and 20 µm. The wording "$D_{50}$" means that 50% by weight of the corresponding particles have a diameter that is smaller than the mentioned value. The average diameter of the magnetic particles may be determined by Laser Diffraction Measurement, in particular Laser Diffraction Measurement using a Mastersizer 2000 with software version 5.12G, wherein the sample is dispersed in an aqueous solution of $Na_4P_2O_7$ The particle size of the magnetic particles, such as the magnetite, can be reduced prior use by grinding or milling.

In general, the amount of the magnetic particles to be applied in the method of the present invention can be determined in a way that advantageously the whole amount of the graphite particles can be separated by agglomerating with the magnetic particles. In a preferred embodiment, the magnetic particles are added in an amount of from 0.01 to 100% by weight, preferably from 0.1 to 20% by weight, particularly preferably from 0.5 to 10% by weight and most preferably 1 to 5% by weight, based on the weight of the dry graphite particles and undesired material.

The magnetic particle is a hydrophobic magnetic particle. Usually, the magnetic particle is hydrophobized on its surface, i.e. is a hydrophobized magnetic particle. Preferably, the magnetic particle has been hydrophobized by treatment with a hydrophobizing agent, wherein preferably the magnetic particle treated with the hydrophobizing agent has a contact angle between the particle surface and water against air of preferably more than 30°, more preferably more than 60°, even more preferably more than 90° and particularly preferably more than 140°. Preferably, the magnetic particle has been pre-treated with the hydrophobizing agent before adding to the feedstock.

In general, the hydrophobizing agent may be any agent that will render the surface of the magnetic particle more hydrophobic than the surface of the magnetic particle before the treatment. Suitable hydrophobizing agents and methods to prepare hydrophobic magnetic particles by treatment with the hydrophobizing agents are known, such as those listed in WO 2016/083491, page 19, line 21 to page 27, line 30, or in WO2015/110555 page 7, line 9 to page 11, line 32.

Examples of hydrophobizing agents are
polyorganosiloxanes;
alkylsiliconates, e.g. alkali or earth alkali $C_{1-6}$ alkylsiliconates, in particular methylsiliconate;
alkyltrichlorosilanes, e.g. $C_{6-12}$ alkyltrichlorosilanes;
alkyltrimethoxysilanes, e.g. $C_{6-12}$ alkyltrimethoxysilanes;
alkylphosphonic acids, e.g. $C_{6-18}$ alkylphosphonic acids, in particular octylphosphonic acid;
mono- or dialkylphosphoric esters, e.g. $C_{6-18}$ mono- or dialkylphosphoric;
fatty acids, e.g. $C_{6-18}$ fatty acid, in particular lauric acid, oleic acid, stearic acid; or mixtures thereof.

The hydrophobizing agent is preferably a polyorganosiloxane. Polyorganosiloxane (also known as silicone) have usually the formula $[R_mSi(O)_{4-m/2}]_2$ where m is from 1 to 3, n is at least 2, and R an organic rest, such as methyl, ethyl, or phenyl. The polyorganosiloxanes may be linear, cyclic or branched. Suitable polyorganosiloxanes and their preparation are known form Ullmann's Encyclopedia of Industrial Chemistry, Volume 32, Entry "Silicones", Wiley-VCH, 2012, page 675-712.

Suitable polyorganosiloxanes are silicon oil, silicon rubber, silicon resin, or block and graft polyorganosiloxane copolymers, wherein silicon oil and silicon resin are more preferred.

Silicon oil (also known as silicon fluids) are usually linear polyorganosiloxanes with typically 2 to 4000 monomer units. Suitable silicon oils are methylsilicone oil, methylphenylsilicon oil, fluorsilicone oil, methylhydrogensilicon oil, or methylalkylsilicone oil. Preferred silicon oils are methylsilicone oil and methylphenylsilicon oil.

Suitable methylsilicone oil are linear polydimethylsiloxanes, which may have a molecuar mass from 500 to 200,000 g/mol. Suitable methylphenylsilicone oil are linear polydimethylsiloxanes, where the methyl groups are partly substituted by phenyl groups, and which may have a molecuar mass from 500 to 200,000 g/mol.

Silicone resins are typically branched polyorganosiloxanes with a molecular weight of below 15,000 g/mol, preferably below 10,000 g/mol. Silicone resins are usually soluble in organic solvents, such as toluene. Preferred silicone resins are MQ, TD and T type silicone resins. Typically, silicone resins are prepared by hydrolysis or alcoholysis of organochlorosilanes, such as methyltrichlorosilane, phenyltrichlorosilane, dimethyldichlorosilane, and diphenyldichloro-silane.

Preferably, the hydrophobizing agent is a silicone resin, such as a branched polyorganosiloxanes with the formula $[R_mSi(O)_{4-m/2}]_n$ where m is from 1.1 to 3, n is at least 10, and R an organic rest, such as methyl or phenyl with a molecular mass below 10,000 g/mol.

Suitable block and graft polyorganosiloxane copolymers are polyorganosiloxane-polyether block polymers, where the polyether block may contain polyethylene glycol and/or polypropylene glycol; or graft polymers of polyorganosiloxane with vinyl monomers, such as styrene, acrylate, or vinyl acetate).

The loaded feedstock is may be a dispersion, preferably an aqueous dispersion. The continuous phase of the dispersion comprises usually at least 50 wt %, preferably at least 80 wt %, and in particular at least 90 wt % of water. The dispersion may have a solid content of 3 to 50 wt %, preferably of 10 to 45 wt %. Usually when the feedstock was a dispersion, then the loaded feedstock is also a dispersion. Preferably the feedstock and the loaded feedstock are aqueous dispersion.

The addition of the hydrophobic magnetic particles to the feedstock results in a loaded feedstock, which contains agglomerates of the magnetic particles, the graphite particles and optionally the collector.

The feedstock or the loaded feedstock may also include further materials. These additional materials may comprise any additive known by the skilled person to be used to improve the dispersion of the particles their surface charges and the chemical properties of the dispersing medium (e.g. the pH-value and the redox-potential). The pH-value of the aqueous dispersion of the feedstock or the loaded feedstock may typically be from about 2 to about 13 and preferably from about 4 to about 12.

Steps a), b) and c) may be carried out at a temperature from about 10 to about 60° C. and preferably at ambient temperature.

The input of mechanical energy, preferably mechanical shear energy, in the loaded feedstock may be helpful in the formation of the agglomerates.

The transfer of mechanical energy may be achieved by any device. For example the transfer of mechanical energy may be achieved by a single stirrer or stirrer arrangement. In addition or alternatively, the transfer of mechanical energy may be achieved by a flow generator, e.g. a pump, generating a turbulent flow in the mixing vessel by means of which turbulent flow the mechanical energy may be transferred into the mixture of the dispersion medium, first type particles, second type particles and magnet type particles.

The mechanical shear energy can be introduced into the loaded feedstock by different means. Typically it is done by a stirred vessel that may contain baffles to render the energy up take more efficient. Other means are milling aggregates like ball mills or any type of stirred ball mills. Also the use of rotor stator mixing devices is possible; or to pump the content of a vessel containing the loaded feedstock in a closed cycle. Provided the correct amount of energy can be introduced the turbulent flow of the dispersion through a pipe conveyed by pumps or by gravity will also yield the required agglomeration. Static mixers and counter current flow mixers are another way to introduce shear energy into the dispersion.

Agglomeration may take place in an agglomeration volume for a batch process. In this case the mixture is put into the volume and e.g. stirred until the desired agglomeration is achieved. Thereafter the mixture is released from the agglomeration volume. Agglomeration may also take place in an agglomeration volume for a continuous flow process. In this case the mixture is continuously fed to and released from the volume containing the stirrer. The desired agglomeration can be controlled by controlling the feed rate to and from the stirring volume i.e. the average residence time of the dispersion in the stirred volume. At a given stirring power the average residence time determines the shear energy up-take of the dispersion.

Step c)

In step c) the agglomerates are separated from the loaded feedstock by a magnetic field which results in isolated agglomerates.

The separation of the agglomerates by the magnetic field (also called the magnetic separation) may be conducted by any method known to the skilled artisan. Suitable magnetic separators are drum separators, high or low intensity magnetic separators, continuous belt type separators or others. Permanent magnets or electromagnets can be used to generate the magnetic field. The magnetic separation may be performed by a continuous or semi-continuous magnetic separation technology as described by e.g. Jan Svoboda "Magnetic Techniques for the Treatment of Materials" (2004).

Suitable magnetic separators are of the LIMS (low intensity magnetic separator), MIMS (medium intensity magnetic separator) or WHIMS (wet high intensity magnetic separator) type as known in the art. In a preferred embodiment of this invention the separators are of the MIMS or WHIMS type. Typical apparatus used for the magnetic separation are disclosed in WO 2011/131411, WO 2011/134710, WO 2011/154178, DE 10 2010 023 130, DE 20 2011 104 707, WO 2011/107353, DE 10 2010 061 952, WO 2012/116909, WO 2012/107274, WO 2012/104292 or WO 2013/167634. The magnetic separator preferably further comprises at least one magnet that is movable alongside the canal. The magnetic separator is preferably operated in countercurrent i.e. the movement of the magnetic field is opposite to the direction of the suspension flow. The field strength of the magnetic field may be at least 0.1, preferably at least 0.3 and in particular at least 0.5 Tesla.

In a preferred embodiment, the magnetic separation equipment allows washing the agglomerate during separation with a dispersant, preferably water. The washing preferably allows removing inert material from the agglomerate.

This magnetic separation step can be repeated, in particular by repeated flow of the non-magnetic product of the foregoing separation step through a consecutive separation path or by modulating the magnetic field. In this consecutive separation steps (known in the art as scavenging) further amounts of collector and/or the hydrophobic magnetic particles may be added prior to the magnetic separation stage as described above for the step b). The agglomerates can be stirred after a first separation and before a second separation, so that trapped second type particles can be set free and can be separated in the second separating step (known in the art as cleaning).

Step d)

The process for concentrating graphite particles may further comprising step d) of breaking up the isolated agglomerates to obtain the magnetic particles and the graphite particles separately.

The breakup of the isolated agglomerates and the separation of the graphite particles from the magnetic particles are usually done in order to recycle the magnetic particles. The graphite particles and the magnetic particles may be separated by applying a magnetic field. As described above with respect to the separation of the agglomerates from the loaded feedstock, also the separation of the magnetic particles and graphite particles can be done once or more a plural of times, optionally with a stirring and de-trapping between separation steps.

The breakup can be achieved by adding a cleaving agent. The cleaving agent may comprise organic solvents, basic compounds, acidic compounds, oxidants, reducing agents, surfactants or mixtures thereof. Preferably, the cleaving agent comprises a mixture of water and surfactant.

Examples of organic solvents as cleaving agents are alcohols, such as methanol, ethanol, propanol, for example n-propanol or isopropanol; aromatic solvents, for example benzene, toluene, xylenes; ethers, for example diethyl ether, methyl t-butyl ether; ketones, for example acetone; aromatic or aliphatic hydrocarbons, for example saturated hydrocarbons with for example 6 to 10 carbon atoms, for example dodecane, Diesel fuel and mixtures thereof. The main components of Diesel fuel are predominantly alkanes, cycloalkanes and aromatic hydrocarbons having about 9 to 22 carbon atoms per molecule and a boiling range between 170° C. and 390° C.

The acidic compounds can be mineral acids, for example HCl, $H_2SO_4$, $HNO_3$ or mixtures thereof, organic acids, for example carboxylic acids.

As oxidants, it is possible to use $H_2O_2$, for example as 30% strength by weight aqueous solution.

Examples of basic compounds are aqueous solutions of basic compounds, for example aqueous solutions of alkali metal and/or alkaline earth metal hydroxides, such as KOH or NaOH; lime water, aqueous ammonia solutions, aqueous solutions of organic amines.

Examples of surfactants are nonionic, anionic, cationic and/or zwitterionic surfactants. In a preferred embodiment, the cleavage is made by the use of preferably biodegradable and/or nonionic surfactants in concentrations in the range of the critical micelle concentrations or above. Preferably, the cleaving agent is a nonionic surfactant added in an amount of from 0.001 to 10% by weight, preferably from 0.01 to 1% by weight, based on the weight of the total liquid phase. The surfactant concentration is preferably at least more than its critical micelle concentration (CMC), more preferably at least twice as high as its CMC.

This breakup can also be aided mechanically, such as by ultrasound or stirring.

The invention further relates to the agglomerate comprising the graphite particle, the hydrophobic magnetic particle, and the collector.

The components of the agglomerate may stick together based on hydrophobic interactions. The agglomerates are generally sufficiently magnetic that an external magnetic field, which can be produced, for example, by means of a strong CoSm permanent magnet, can at least still magnetically deflect these agglomerates when the agglomerates flow past the external magnet. The hydrophobic interactions within the agglomerates are generally strong enough for them to remain stable, i.e. not to be torn apart, at the flow velocity mentioned.

The agglomerate may comprise 0.1 to 99.99 wt %, preferably 1 to 80% of the graphite particles.

The agglomerate may comprise 0.01 to 99.9 wt %, preferably 20 to 99% of hydrophobic magnetic particle.

The agglomerate may comprise 0.01 to 90 wt %, preferably 1 to 50% of the collector.

EXAMPLES

Example 1 a) Feedstock

A graphite ore from a European deposit containing 20% of graphite and 0.03% of carbon as carbonates and feldspar as calcian Albite, Sanidine, Quartz, Pyrrhotite and Biotite as main crystalline constituents according to a XRD-analysis was milled to a particle size $D_{50}$ of 20 μm. 20 g (19.9 g dry mass) of this milled ore were dispersed in 60 g of filtrated river water followed by the addition of 100 mg of Hydrocarbon Collector (a technical mixture of linear, branched and cyclic alkanes (mainly $C_{9-11}$), aromatic content below 2%, initial boiling point 160° C.) (0.5 wt % based on dry mass feedstock). Afterwards this dispersion was vigorously mixed in a buffled beaker with an Ultra Turrax® T25 stirrer for 10 min at 10000 rpm (spec. energy input approx. 600 kWh/m³).

b) Agglomeration

Dried hydrophobic magnetite particles were prepared according to Example 1 of WO 2015/110555 based on magnetite particles with a $D_{50}$ 4 μm and a polyorganosiloxane (a solid methyl silicone resin, Mp 35-55° C., average composition of approx. $[CH_3SiO_{1.5}]_{100}$ having a molecular weight Mw of approx. 6700 g/mol).

The hydrophobic magnetite particles (0.6. g) were suspended in 3.6 g of a 0.1 wt % solution of an ethoxylated alkanol (liquid, cloudpoint about 55° C. as 1% in water according to EN1890) in water.

To the resulting feedstock of step a) the suspension of 0.6 g hydrophobic magnetite particles was added and stirred in a buffled beaker by a 30 mm pitch blade stirrer at 1400 rpm for 15 min (spec. energy input approx. 0.7 kWh/m³) at room temperature.

c) Magnetic Separation

The resulting dispersion is pumped with a rate of 6 l/h to an Wet High Intensity Magnetic Separator (WHIMS) lab-scale magnetic separator equipped with a 4×2 mm wedged wire matrix at a magnetic field strength of 0.7 T (commercially available from Eriez Magnetics Europe Ltd., UK). After completion of the feed addition the matrix is flushed with water. The combined dispersion and flush water are collected as non-magnetic tailings. Afterwards the magnetic field was switched of and the magnetic fraction containing the magnetite graphite agglomerates are flushed out from the matrix yielding the magnetic concentrate. The results of the analysis are summarized in Table 1. The graphite content has been determined by combustion of the samples in air and determination of the amount of carbon dioxide generated.

It was demonstrated that the graphite content was increased from 20% in the graphite ore to 43.6% in the magnetic concentrate.

TABLE 1

|  | Non-magnetic tailings | Magnetic concentrate |
| --- | --- | --- |
| Dry mass | 11.59 g | 8.90 g |
| Graphite content | 1.0% | 43.6% |
| Graphite recovery | 3.1% | 96.1% |

Example 2

Experimental conditions as in example 1 were used except that 20.1 g feed as dry mass and 500 mg of the Hydrocarbon Collector (2.5 wt % based on dry mass feedstock) were employed. The results of the analysis are summarized in Table 2.

TABLE 2

|  | Non-magnetic tailings | Magnetic concentrate |
| --- | --- | --- |
| Dry mass | 11.88 g | 8.84 g |
| Graphite content | <0.5% | 46.1% |
| Graphite recovery | <1.4% | >98.6% |

The invention claimed is:

1. A process for concentrating graphite particles comprising
   a) providing a feedstock which contains the graphite particles and an undesired material,
   b) adding hydrophobic magnetic particles to the feedstock which results in a loaded feedstock containing agglomerates of the magnetic particles and the graphite particles, and
   c) separating the agglomerates from the loaded feedstock by a magnetic field which results in isolated agglomerates;
   wherein the magnetic particles are added to the feedstock in an amount of from 0.1 to 20% by weight, based on the weight of the dry graphite particles and undesired material.

2. The process according to claim 1, which further comprises d) breaking up the isolated agglomerates to obtain the magnetic particles and the graphite particles separately.

3. The process according to claim 1, wherein the feedstock is a dispersion.

4. The process according to claim 1, wherein the feedstock is an aqueous dispersion.

5. The process according to claim 1, wherein the feedstock further contains a collector, which selectively forms a hydrophobic layer on the graphite particles.

6. The process according to claim 5, wherein the collector is a hydrocarbon selected from the group consisting of mineral oils, vegetable oils, biodiesel, BtL (Biomass-to-Liquid) fuels, products of coal liquefaction, products of the GtL (Gas to Liquid, from natural gas) process, long chain alcohols, and mixtures thereof.

7. The process according to claim 1, wherein the feedstock comprises 5 to 99 wt % graphite.

8. The process according to claim 1, wherein the magnetic particles are added to the feedstock in an amount of from 0.5 to 10% by weight, based on the weight of the dry graphite particles and undesired material.

9. The process according to claim 1, wherein the feedstock is based on natural graphite ore, electronic scrap, or battery scrap.

10. The process according to claim 1, wherein the undesired material comprises a hydrophilic metal compound or a hydrophilic semimetal compound.

11. The process according to claim 1, wherein the feedstock is subjected to a magnetic separation to remove a magnetic or magnetizable material.

12. The process according to claim 1, wherein the concentration of the graphite particles in the feedstock is increased by the process by a factor of 1.1 to 100.

13. The process according to claim 1, wherein the hydrophobic magnetic particles are hydrophobized by treatment with a hydrophobizing agent selected from the group consisting of polyorganosiloxanes, alkylsiliconates, alkyltrichlorosilanes, alkyltrimethoxysilanes, alkylphosphonic acids, mono- or dialkylphosphoric esters, fatty acids and mixtures thereof.

14. The process according to claim 1, wherein the graphite particles have an average diameter $D_{50}$ of 1 nm to 1 mm.

15. The process according to claim 1, wherein the magnetic particles comprise magnetic metals, ferromagnetic or ferrimagnetic alloys of magnetic metals, magnetic iron oxides, cubic ferrites; or mixtures thereof.

16. The process according to claim 1, wherein the graphite particles comprise graphite which is a hexagonal or rhombohedral crystalline, multi-layer modification of chemical element carbon.

17. An agglomerate produced by the process as defined in claim 1, comprising a graphite particle, a hydrophobic magnetic particle, and a collector.

18. A process for concentrating graphite particles comprising
a) providing a feedstock which contains the graphite particles and an undesired material,
b) adding hydrophobic magnetic particles to the feedstock which results in a loaded feedstock containing agglomerates of the magnetic particles and the graphite particles, and
c) separating the agglomerates from the loaded feedstock by a magnetic field which results in isolated agglomerates;
wherein the feedstock further contains a collector, which selectively forms a hydrophobic layer on the graphite particles,
wherein the feedstock comprises 0.1 to 10 wt % of the collector, based on dry mass of the feedstock.

19. The process according to claim 18, wherein the magnetic particles are added to the feedstock in an amount of from 0.01 to 100% by weight, based on the weight of the dry graphite particles and undesired material.

* * * * *